(12) United States Patent
Haque et al.

(10) Patent No.: US 9,814,988 B2
(45) Date of Patent: Nov. 14, 2017

(54) GAMES CONSOLE ADAPTOR UNIT (75) Inventors: Shaheedur Reza Haque, London (GB); Gerard Anthony Brian Keating, Rhu (GB); David Cecil Robinson, Maidenhead (GB); Richard Andrew Morrell, Berkshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2815 days.

(21) Appl. No.: 10/537,175

(22) PCT Filed: Oct. 24, 2003

(86) PCT No.: PCT/GB03/04596
§ 371 (c)(1),
(2), (4) Date: Jun. 15, 2006

(87) PCT Pub. No.: WO2004/050202
PCT Pub. Date: Jun. 17, 2004

(65) Prior Publication Data
US 2006/0252545 A1    Nov. 9, 2006

(30) Foreign Application Priority Data
Dec. 2, 2002   (GB) .................................. 0228072.5

(51) Int. Cl.
*A63F 13/95*    (2014.01)
*H04N 21/414*   (2011.01)
(Continued)

(52) U.S. Cl.
CPC .............. *A63F 13/95* (2014.09); *A63F 13/02* (2013.01); *H04N 7/173* (2013.01);
(Continued)

(58) Field of Classification Search
CPC ........ A63F 13/95; A63F 13/02; A63F 13/338; A63F 2300/409; H04N 7/173;
(Continued)

(56) References Cited

U.S. PATENT DOCUMENTS 6,599,194 B1 * 7/2003 Smith et al. .................... 463/30
7,124,938 B1 * 10/2006 Marsh ........................... 235/382
(Continued)

FOREIGN PATENT DOCUMENTS

EP    0 461 910 A2   12/1991
EP    0 794 669 A2    9/1997
(Continued)

OTHER PUBLICATIONS

"WinTV-USB and WinTV-USB-FM Specifications", 2002, Hauppauge Computer Works, Inc. available at <http://www.hauppauge.com/html/usb_data.htm>.*
(Continued)

*Primary Examiner* — Werner Garner
(74) *Attorney, Agent, or Firm* — Fay Sharpe LLP (57) ABSTRACT

An adaptor is provided for a games console which allows users to gain access to interactive television services through the games console. The adaptor includes a television tuner for receiving broadcast television channels, a communications controller which controls communications between the adaptor and the games console and an interface for interfacing the adaptor to the games console. In a preferred embodiment, the adaptor also includes a hard disc for storing video data and for storing game history data. The adaptor may also include a modem via which the user can gain access to remote servers connected to a data network.

25 Claims, 3 Drawing Sheets

(51) Int. Cl.
| | |
|---|---|
| *H04N 21/478* | (2011.01) |
| *H04N 21/41* | (2011.01) |
| *H04N 21/4405* | (2011.01) |
| *H04N 21/4782* | (2011.01) |
| *H04N 21/426* | (2011.01) |
| *H04N 21/418* | (2011.01) |
| *H04N 7/173* | (2011.01) |
| *A63F 13/98* | (2014.01) |
| *A63F 13/338* | (2014.01) |

(52) U.S. Cl.
CPC ....... *H04N 21/4104* (2013.01); *H04N 21/414* (2013.01); *H04N 21/4181* (2013.01); *H04N 21/42676* (2013.01); *H04N 21/4405* (2013.01); *H04N 21/4781* (2013.01); *H04N 21/4782* (2013.01); *A63F 13/338* (2014.09); *A63F 2300/409* (2013.01)

(58) Field of Classification Search
CPC ............. H04N 21/4104; H04N 21/414; H04N 21/4181; H04N 21/42676; H04N 21/4405; H04N 21/4781; H04N 21/4782
USPC .......................................... 463/30–31, 39–47
See application file for complete search history.

(56) References Cited

U.S. PATENT DOCUMENTS

| | | | |
|---|---|---|---|
| 2002/0007357 A1* | 1/2002 | Wong et al. ...................... | 707/1 |
| 2002/0086724 A1* | 7/2002 | Miyaki et al. .................... | 463/9 |
| 2002/0169973 A1* | 11/2002 | Kim et al. ..................... | 713/193 |
| 2003/0027637 A1* | 2/2003 | Sato ................................ | 463/42 |

FOREIGN PATENT DOCUMENTS

| | | |
|---|---|---|
| GB | 1 591 290 | 6/1981 |
| GB | 2 086 115 A | 5/1982 |
| GB | 2 141 907 A | 1/1985 |
| GB | 2 244 896 A | 12/1991 |
| GB | 2 253 325 A | 9/1992 |
| GB | 2 286 954 A | 8/1995 |
| WO | WO 01/36061 A1 | 5/2001 |

OTHER PUBLICATIONS

FWIFFO: "Linksys WCF11 Instant Wireless Network CF Card Linksys" [Online] Nov. 9, 2002 (Nov. 9, 2002), Game Over Magazine Retrieved from the Internet: URL:http://www.game-over.net/reviews.php?page=features&id=83>; 3 pages.
EBU Project Group B/CA: "Functional model of a conditional access system";EBU Technical Review, Winter, 1995, 14 pages.

* cited by examiner

GAMES CONSOLE ADAPTOR UNIT

BACKGROUND OF THE INVENTION

The present invention relates to an adaptor unit for use with a games console. The invention has particular, although not exclusive relevance to an adaptor unit which connects to the games console and which increases the functionality of the games console.

Various games consoles have been proposed which connect to a television set and which allow users to play game products which can be bought for the console. Examples of this type of games console include the Sony Playstation, the Nintendo Game Cube or Microsoft's Xbox.

SUMMARY OF THE INVENTION

One aim of the present invention is to provide an adaptor unit for a games console which includes television signal receiving circuitry and which allows the games console to function as an interactive television receiver.

In one embodiment, an adaptor is provided for a games console which allows users to gain access to interactive television services through the games console. The adaptor includes a television tuner for receiving broadcast television channels, a communications controller which controls communications between the adaptor and the games console and an interface for interfacing the adaptor to the games console. In a preferred embodiment, the adaptor also includes a hard disc for storing video data and for storing game history data. The adaptor may also include a modem via which the user can gain access to remote servers connected to a data network.

BRIEF DESCRIPTION OF THE DRAWINGS

An exemplary embodiment of the invention will now be described with reference to the following drawings in which.

DETAILED DESCRIPTION OF THE INVENTION

Overview

Figure 1:
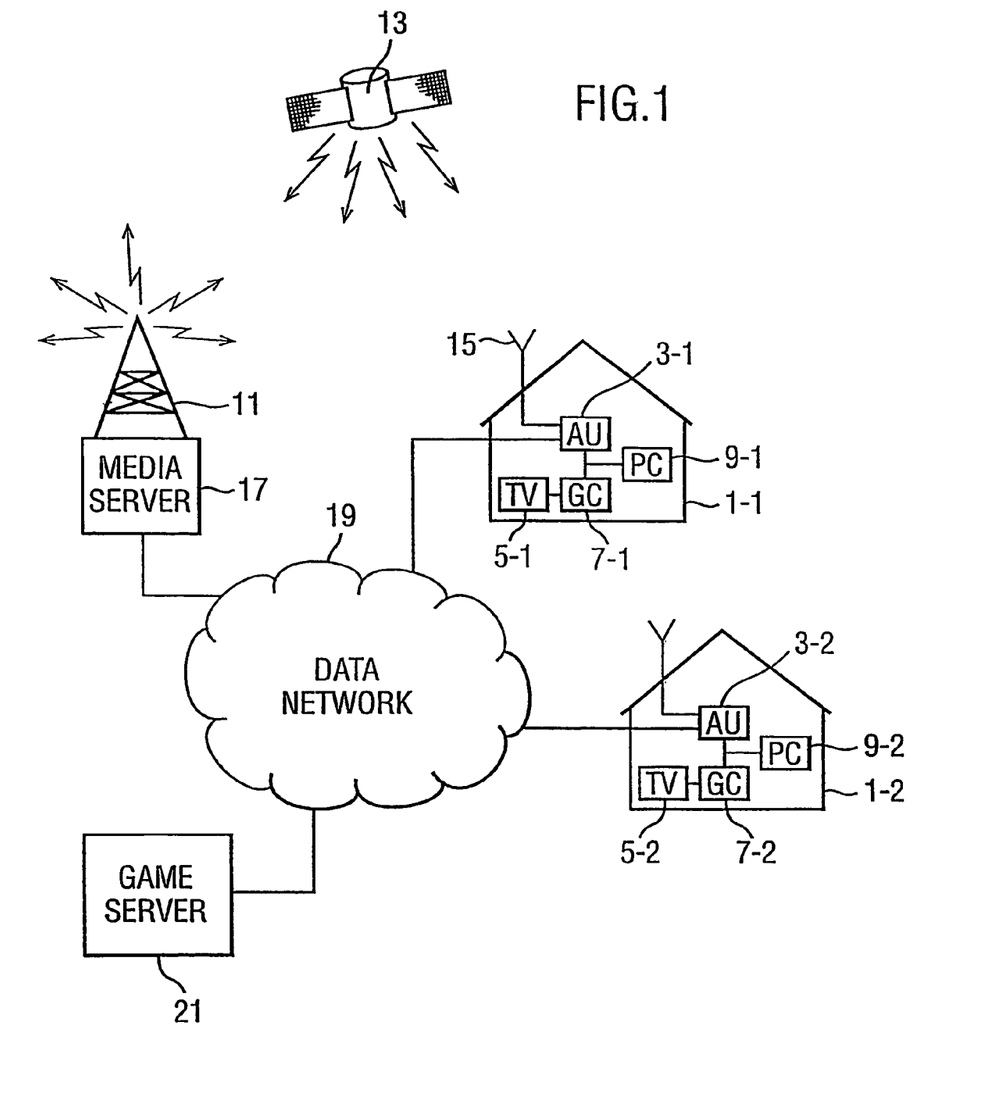
FIG. 1 is a schematic diagram illustrating an interactive television system.

FIG. 1 is a schematic diagram illustrating an interactive television system. As shown in FIG. 1, the system includes, a number of user stations, two of which are shown and labelled 1-1 and 1-2. Each user station 1 includes an adaptor unit (AU) 3, which is connected to a television (TV) 5 through a games console (GC) 7. Each user station 1 also includes a personal computer (PC) 9 which is also connected to the adaptor unit 3. The adaptor unit 3 is arranged to receive broadcast video data from a broadcast media server transmitter 11 or from an overhead satellite 13 via an aerial 15 on the user station 1. The adaptor unit 3 can also receive video data from a media server 17 through a data network 19. In this embodiment, the games console 7 can also be connected to a remote game server 21 via the adaptor unit 3 and the data network 19. This allows the downloading of games and the like from the games server 21 to the games console 7 for play out with the user.

Adaptor Unit and Games Console

Figure 2:
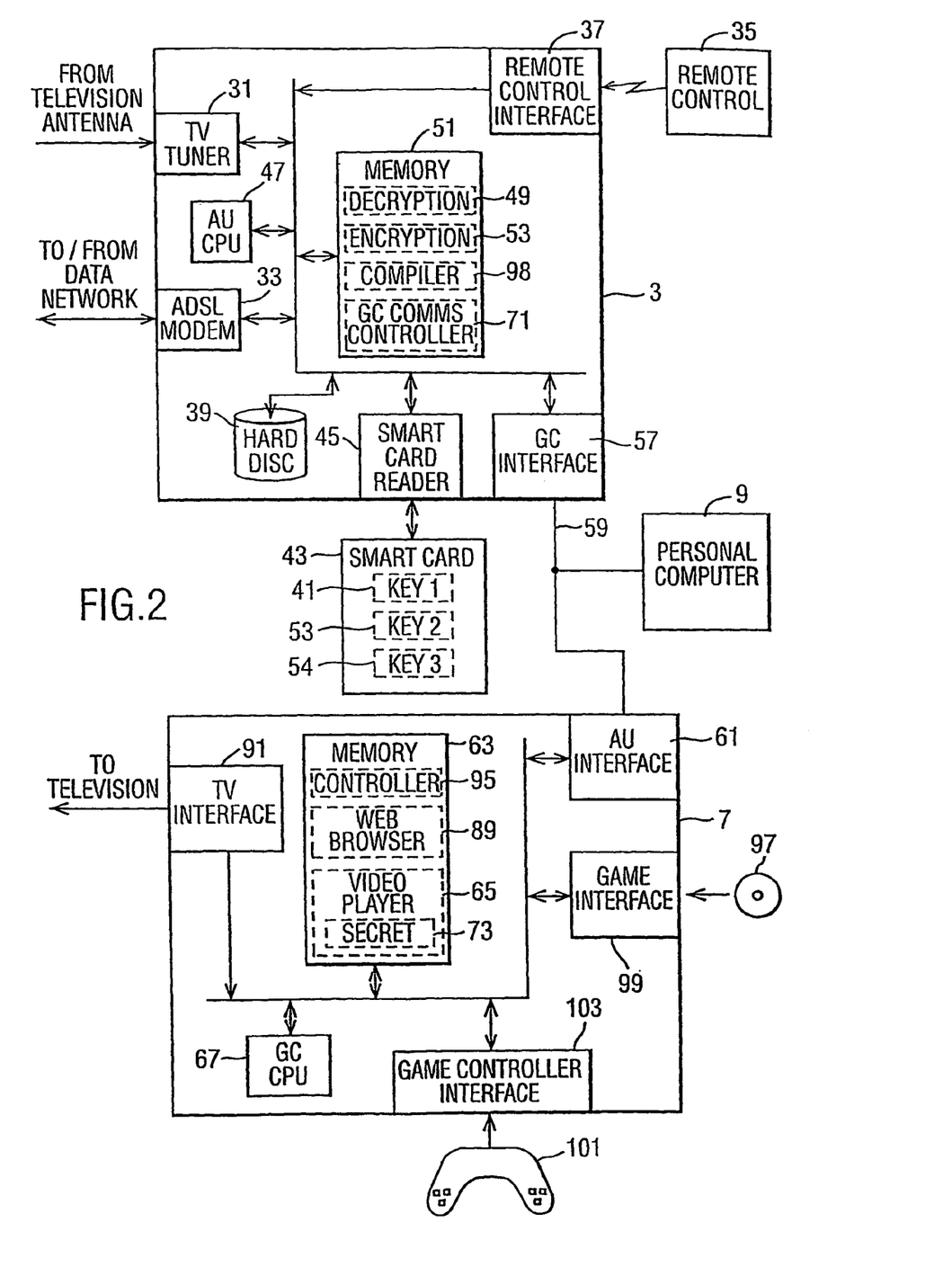
FIG. 2 is a block diagram illustrating the main components of an adaptor unit and a games console forming part of the system shown in FIG. 1.

FIG. 2 is a block diagram illustrating in more detail the main components of the adaptor unit 3 and the games console 7. As shown, the adaptor unit 3 includes a television tuner 31 for receiving video signals from the overhead satellite 13 or the broadcast transmitter 11 via the television aerial 15. The adaptor unit 3 also includes an ADSL modem 33 for connecting the adaptor unit 3 to the data network 19 so that the adaptor unit 3 can receive video data from the remote media server 17. The ADSL modem 33 can also transmit messages received from a user via a remote control 35 and a remote control interface 37, back to the remote media server 17. These user requests may be requests to download or stream a specific video file or to control the streaming of an existing file being received. The adaptor unit 3 also includes a hard disk 39 into which received video files can be recorded for subsequent play out to the user on the television 5. The provision of a hard disk 39 in the adaptor unit 3 facilitates the provision of a personal video recorder (PVR) system in which the user can, for example, pause live television as it is being received, for subsequent play out from the hard disk 19. In this embodiment, this control of the received video stream is performed by the user via the remote control 35 and the remote control interface 37.

In this embodiment, the video data received by the television tuner 31 and the ADSL modem 33 is encoded MPEG video data that is encrypted using the 3DES encryption technique. The decryption key 41 (labelled Key 1) necessary for decrypting the received video streams is provided on a smart-card 43 which is read into the adaptor unit 3 via a smart-card reader 45. A central processing unit (CPU) 47 runs a decryption module 49 stored in a memory 51 using the decryption key 41 to decrypt the received video data. The adaptor unit CPU 47 then re-encrypts the decrypted video data using an encryption module 53 stored in the memory 51 together with an encryption key 53 (labelled Key 2) stored on the smart-card 43. In this embodiment, the encryption module re-encrypts the decrypted video data using an AES encryption technique.

The re-encrypted video data is then passed to a games console communications controller 56 which outputs the encrypted video data to the games console 7 via a games console interface 57 (such as a USB port, an ethernet port, Firewire port etc.) and a connector 59. The encrypted video data is received at an adaptor unit interface 61 (such as a USB port, an ethernet port, Firewire port etc.) of the games console 7 and passed into the games console memory 63 where it is decrypted and decoded by a video player module 65 under control of the games console central processing unit 67. In order that the video player 65 can decrypt the received encrypted video data, it must have the decryption key corresponding to the encryption key 53. In this embodiment, this decryption key is stored in the smart-card 43 and is labelled Key 3 and referenced 54. Further, in this embodiment, it is not possible to decrypt the encrypted video data using only the decryption key 54. Instead, the decryption key 54 must be combined with a secret 73 which is embedded within the compiled version of the video player 65, to generate the code words necessary to decrypt the video data. Since only the video player module 65 knows the secret 73, it is only the video player 65 which can perform the decryption. Consequently, even though the personal computer 9 may have access to the decryption key 54 and to the encrypted video data via the connector 59, it cannot decrypt the video data to regenerate the decrypted video frames.

Video Player

Figure 3:
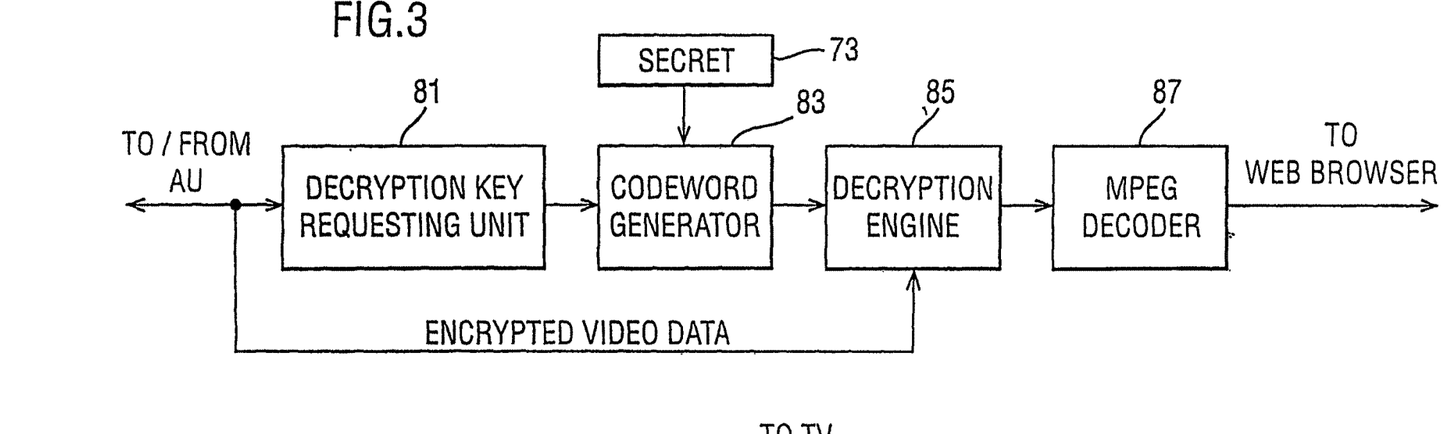
FIG. 3 is a block diagram illustrating the main components of a video player forming part of the games console shown in FIG. 2.

FIG. 3 shows in more detail the functional components of the video player module 65. As shown, the video player module 65 includes a decryption key requesting unit 81 which operates, upon the initial receipt of encrypted video data from the adaptor unit 3, to transmit a request via the adaptor unit interface 61, the connector 59 and the games console interface 57, to the adaptor unit 3 for the appropriate decryption key 54 for decrypting the received video data. This request is dealt with by the games console communications controller 71 within the adaptor unit memory 51, which retrieves the appropriate decryption key 54 from the smart-card 43 via the smart-card reader 45. The games console communications controller 71 then transmits the decryption key 54 back to the decryption key requesting unit 81 via the games console interface 57, the connector 59 and the adaptor unit interface 61. The decryption key requesting unit 81 then passes the received decryption key 54 to a code word generator 83 which combines the received decryption key 54 with the secret 73, to generate the code words which can be used to decrypt the encrypted received video data. As shown in FIG. 3, the code words generated by the code word generator 83 are then passed to a decryption engine 85 which uses them to decrypt the encrypted video data received from the adaptor unit 3. The decrypted video data is then passed to an MPEG decoder 87 which decodes the MPEG video data to generate the decoded video data.

Web Browser

In this embodiment, the decoded video data generated by the video player module 65 is output to a web browser module 89 running in the games console memory 63. In this embodiment, it is the web browser module 89 which generates the appropriate television frames which are output to the television 5 via a television interface 91. In particular, the web browser 89 is used to combine the video frames generated by the video player module 73 with menu frames providing the user with different menu options relating to the interactive television system.

Figure 4:
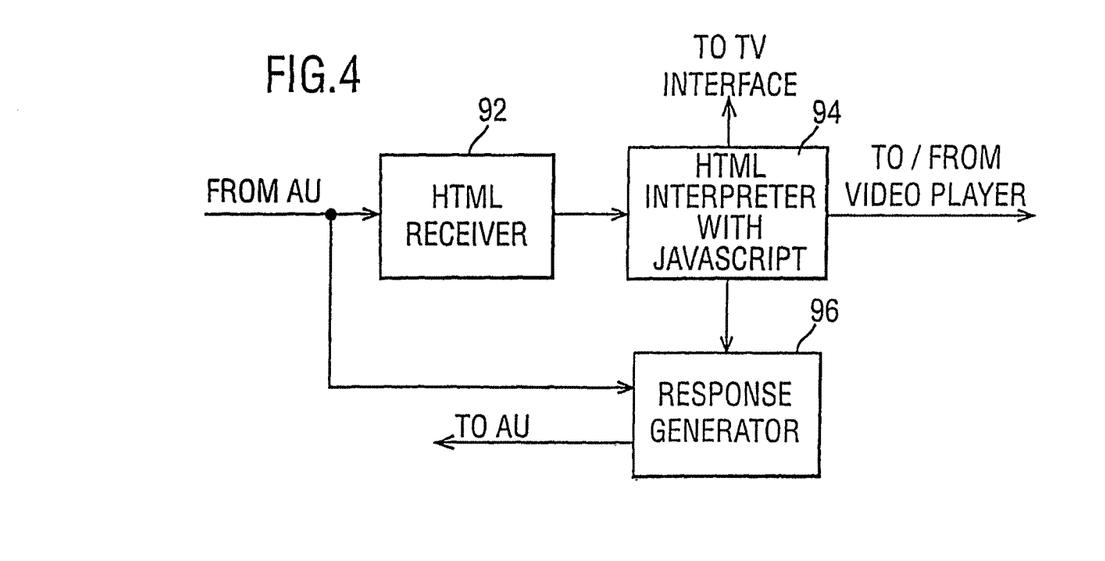
FIG. 4 is a block diagram illustrating the main functional components of a web browser forming part of the games' console shown in FIG. 2.

FIG. 4 is a block diagram illustrating the main functional components of the web browser module 89. As shown, in this embodiment, the web browser module 89 includes an HTML receiver 92 which operates to receive HTML web pages from the remote media server 17 via the data network 19 and the adaptor unit 3. The HTML receiver 92 then passes the received HTML pages to an HTML interpreter 94 which processes the HTML file to generate the appropriate menu page for output to the television interface 91. In this embodiment, for some of the menu pages, video data will be displayed in a video window within the menu page. For these menu pages, the HTML interpreter 94 requests the appropriate video data from the video player module 65. The received video data is then combined with the menu page video data and output to the TV interface 91 for display to the user on the television 5. In this embodiment, the menu pages provide the user with different options such as the accessing of an electronic programme guide, the accessing of email, web services, video-on-demand etc. The user can then use the remote control 35 to browse through the menu pages and/or to select items from the menu pages.

In this embodiment, the HTML menu pages received from the remote media server 17 include instructions for the web browser module 89 which associate key presses on the remote control 35 to the links for the other menu pages and/or the television services selected by the user. In this embodiment, the HTML interpreter 94 passes these instructions to a response generator 96. Subsequently, when a user presses a key on the remote control 35, the remote control interface 37 passes data identifying the key-press to the communications controller 71, which in turn passes the data to the web browser module 89 via the games console interface 57, the connector 59 and the adaptor unit interface 61. The key-press data is then passed to the response generator 96 which interprets the key-press based on the instructions associated with the current menu page being displayed. In this embodiment, these instructions associated with the menu page are Javascript instructions and the response generator 96 includes an appropriate Javascript command processor (not shown) for interpreting the instruction. The response generator 96 then takes the appropriate action based on the user's input, such as transmitting a request back to the remote media server 17, via the adaptor unit 3 and the data network 19, requesting a new video stream.

In this embodiment, the web browser module 89 and the video player module 65 are both generated by the adaptor unit 3 and downloaded, in compiled format, into the games console memory 63. In particular, in this embodiment, both the web browser module 89 and the video player module 65 are stored in uncompiled form within the hard disc 39 of the adaptor unit 3. These programs can then be updated from time to time by downloading new programs via the ADSL modem 33. The uncompiled programs are then compiled by a compiler module 98 run in the adaptor unit memory 51. During the compilation of the video player module 65, the compiler 98 inserts an appropriate secret 73 so that the video player 65 can decrypt the video data. In this embodiment, the compiled versions of the web browser module 89 and the video player module 65 are downloaded into the games console memory 63 during a set-up routine when the adaptor unit 3 is initially connected to the games console 7 via the connector 59. As those skilled in the art will appreciate, the transmission of the video player 65 in compiled format over the connector 59 is secure since the compiled version of the video player module 65 will not run on the personal computer 9. This is because, the personal computer 9 and the games console 7 operate with different processors and micro-instructions. Further, for added security, a new version of the video player module 65 can be downloaded into the games console memory 63 at regular intervals, in order to change the secret 73 embedded therein. In this case, a corresponding change of the AES encryption and decryption keys 53 and 54 will also be required to work with the new secret 73.

In the event that the user wishes to play a game, the video data for the game is generated by a game controller module 95 from data received from a game CD-ROM 97 via a game interface unit 99. The controller module 95 also generates the video data for the game in dependence upon user inputs from a game pad 101 and a game controller interface 103. In this embodiment, the controller module 95 allows a user to save a current position in a game being played by storing the necessary game history data in the hard disc 39 of the adaptor unit 3. In particular, if the user presses a key on the game pad 101 in order to save the game at the current position, the game controller 95 transmits a request together with the appropriate game history data to the games console communications controller 71 in the adaptor unit 3 via the adaptor unit interface 61, the connector 59 and the games console interface 57. Upon receipt of the game history data, the games console communications controller 71 stores the history data in the hard disc 39. Subsequently, if the user inputs via the game pad 101 that they wish to resume playing the game, the game controller module 95 transmits another request to the games console communications controller 71 for the appropriate game history data. Again, this request is transmitted via the adaptor unit interface 61, the connector 59 and the games console interface 57. In response, the games console communications controller 71 retrieves the requested game history data from the hard disc 39 and transmits it back to the controller 95 via the games console interface 57, the connector 59 and the adaptor unit interface 61. The controller 95 then resumes playing the game using the stored history data and the game data from the CD-ROM 97.

Additionally, in this embodiment, the user can request to download new games from a remote game server 21 connected to the data network 19. In particular, in this embodiment, the user can gain access to the remote game server 21 using the web browser module 89. In particular, one of the options on one of the menu pages generated by the web browser 89 includes the option to access the web page for the game server 21. Whilst accessing the game server 21, the user can play games online and/or download games via the data network 19 and the ADSL modem 33 and store the game in the hard disc 39. The user can then access the games stored in the hard disc 39, again through appropriate navigation through the menu pages generated and controlled by the web browser 89. Once a game has been selected for retrieval from the hard disc 39, the games console communications controller 71 reads the game from the hard disc 39 and transmits it via the games console interface 57, the connector 59 and the adaptor unit interface 61 to the game controller 95 which then controls the playing of the game.

Modifications and Alternatives

In the above embodiment, the video player and the web browser were downloaded in compiled format into the games console and the compiled video player included a secret that was used to decrypt the video data received from the adaptor unit. Because the secret is only available within the games console, the adaptor unit can act as the hub of an ethernet LAN network within the user station. In this case, the connector connecting the adaptor unit to the games console would form part of the LAN connections, with other computer devices, such as the personal computer being coupled to the LAN via this connector.

In the above embodiment, both a video player and a web browser were downloaded into the games console from the adaptor unit. The use of a web browser in addition to the video player allowed the user to interact and gain access to services provided by remote servers coupled to the data network. However, as those skilled in the art will appreciate, the use of such a web browser is not essential. The menu pages may be pre-stored within the games console or the adaptor unit and accessed by the user pressing an appropriate key on the game pad or on the remote control. In such an embodiment, only the video player would be downloaded from the adaptor unit into the games console.

In the above embodiment, the user navigated through the menu pages using the remote control. In an alternative embodiment, the user may use the game pad in addition to or instead of the remote control to navigate through the menu pages.

In the above embodiment, the adaptor unit and the games console were connected together by a connector. This connector may be any appropriate connector, such as one or more wires or a wireless interface. The adaptor unit may also be arranged in the form of a cartridge which can be inserted into an appropriate slot of the games console.

In the above embodiment, the adaptor unit included both a television tuner and an ADSL modem. As those skilled in the art will appreciate, in an alternative embodiment one of these video receivers may be omitted.

In the above embodiment, a remote control interface was provided in the adaptor unit. Alternatively, the remote control interface may be omitted or provided within the games console.

In the above embodiment, the video player and the web browser were downloaded in compiled format from the adaptor unit. In an alternative embodiment, the video player and/or the web browser may be provided in compiled format on a CD-ROM and read into the games console via the game interface. However, such an embodiment is not preferred because of the ease with which CD-ROMs can be copied.

In the above embodiment, the received video data was initially decrypted within the adaptor unit and then re-encrypted using a different encryption technique. This is because the video data must be encrypted using a user-specific encryption code so that it can only be decrypted by a video player having the above-described secret. However, as those skilled in the art will appreciate, this is not essential. The encrypted video data received by the adaptor unit may be passed directly to the games console. In this case, the decryption key used to decrypt the received video data would preferably be processed by the adaptor unit with the user's secret to generate an appropriate intermediate decryption key which can be passed from the adaptor unit to the games console over the connector. The games console can then use the user's secret to transform the intermediate decryption key into the decryption key necessary to decrypt the received video data. Again, since the games console only knows the user's secret, other devices (such as the personal computer) coupled to the connector cannot decrypt the received video data.

In the above embodiment, the decoded video data and the games video data were output to a television interface. If the television is a digital television, then this television interface may comprise a frame buffer. However, if the television is an analogue television, then the television interface will include an appropriate analogue video signal generator which generates an appropriate video signal from the digital video data.

In the above embodiment, a secret was embedded within the video player so that encrypted video data could be transmitted over an unsecured communications link which connected the adaptor unit to the games console. As those skilled in the art will appreciate, a similar secret may be embedded within the web browser in order to keep secret any communications transmitted between the adaptor unit and the browser in the games console. This may be used, for example, in order to provide a secure communications channel between the games console and the remote game server. This allows the game server to be able to encrypt the games which are downloaded to the games console via the adaptor unit so that they cannot be accessed by a device also connected to the connection between the adaptor unit and the games console. Such a secure communication link between the games console and the remote game server can also be used, for example, to control micropayments for playing a downloaded game. For example, the secure communication link may be used by the user to pay for a game before it is downloaded. Alternatively, each time the game is played the browser may signal this to the adaptor unit which can either increment a charge based on how long the game has been played or send a message to the remote game server where the appropriate charge is made.

In addition to providing the games console with an interface to remote game servers, the adaptor unit also provides the games console with an interface to other users via the data network to which the adaptor unit is attached. The user of the games console can therefore take part in network gaming in which users of different games consoles can simultaneously play a game with multiple users distributed at different physical locations on the data network.

In the main embodiment described above, the encryption and decryption keys for the video data were stored on a smart-card which could be inserted into the adaptor unit. As those skilled in the art will appreciate, it is not essential to store these keys on a smart-card. A separate "smart processor" may be built onto the mother-board of the adaptor unit. However, the use of a smart-card or the like is preferred because it is easy to replace the smart-card if it is believed that the security of the encryption and/or decryption keys has been compromised.

The invention claimed is:

1. A games system comprising
a games console and
an adaptor unit,
wherein the games console comprises:
   a console housing;
   a game interface within said console housing configured to receive a game product;
   a display interface within said console housing configured to interface said games console to a display;
   a user interface within said console housing configured to receive a user input;
   a game controller within said console housing configured to receive game data from said game interface to receive said user input from said user interface, and to generate therefrom game video data for output to said display interface;
   an adaptor interface within said console housing configured to couple the games console with said adaptor unit;
   a memory within the console housing configured to store software modules; and
   a console processor within the console housing configured to execute the software modules stored in the memory;
wherein said adaptor unit comprises:
   an adaptor housing;
   a memory within the adaptor housing configured to store a video player software module;
   a video data receiver within said adaptor housing configured to receive encoded video data from a remote video provider;
   a games console interface within said adaptor housing configured to interface said adaptor unit to said adaptor interface of said games console;
   a communications controller within said adaptor housing configured to control communications between the adaptor unit and said games console via said games console interface and said adaptor interface; and
   a large capacity storage device configured to store at least one of the encoded video data, game video data, and game data;
wherein the game controller is responsive to the user input from the user interface and configured to transmit game history data to the communications controller of the adaptor unit via the games console interface and the adaptor interface, wherein the communications controller is configured to store the game history data in the large capacity storage device;
wherein the communications controller is configured to output the video player software module and the encoded video data to the games console;
wherein the games console is configured to receive the video player software module from the adaptor unit, store the video player software module in the memory of the games console, use the console processor to execute the video player software module, receive the encoded video data from the adaptor unit, and use the video player software module to generate decoded video data from the received encoded video data for output to the display via the display interface.

2. The system according to claim 1, wherein the adaptor unit further comprises
   an encryption processor configured to encrypt the encoded video data to form encrypted video data for output to said games console via said games console interface and
   wherein said console processor, in conjunction the video player software module, includes
      a decryption processor configured to decrypt the encrypted video data.

3. The system according to claim 2, wherein said video player software module includes embedded data for use in conjunction with decrypting the encrypted video data.

4. The system according to claim 3, wherein said adaptor unit further comprises
   a secure processor configured to store an encryption key for use by said encryption processor in conjunction with encrypting said encoded video data.

5. The system according to claim 4, wherein an intermediate decryption key is provided in said secure processor,
   wherein said communications controller is configured to pass said intermediate decryption key to said games console via said games console interface and said adaptor interface and
   wherein said decryption processor is configured to decrypt said encrypted video data using said embedded data and said intermediate decryption key.

6. The system according to claim 4, wherein said secure processor is formed on a smart-card which is retractable from a smart-card reader mounted within said adaptor housing.

7. The system according to claim 1, wherein said adaptor unit further comprises
   a modem within said adaptor housing configured to connect the adaptor unit to a data network.

8. The system according to claim 7, wherein said games console further comprises
   a web browser within said console housing configured to receive menu pages from a remote server via said modem, said games console interface, and said adaptor interface and configured to generate menu screens for output to said display interface.

9. The system according to claim 7, wherein said games console is configured to transmit and receive at least a portion of the game data to and from said data network via said modem and said adaptor unit in conjunction with providing network gaming to a user.

10. The system according to claim 1 wherein the user input includes a first request to save a current position in a first game and corresponding game history data for the first game in the large capacity storage device and a second request to retrieve a saved position in the first game or a second game and corresponding saved game history data for the corresponding game from the large capacity storage device.

11. The system according to claim 1 wherein the video player software module is configured to decode the encoded video data to form the decoded video data suitable for display such that execution of the video player software module by the console processor decodes the encoded video data received from the adaptor unit to form the decoded video data for output to the display via the display interface of the games console.

12. An adaptor unit for use with a games console, the adaptor unit comprising:
an adaptor housing;
a memory within the adaptor housing configured to store a video player software module;
a video data receiver within the adaptor housing configured to receive encoded video data from a remote video provider;
a games console interface within said adaptor housing configured to interface said adaptor unit to said games console;
a communications controller within said adaptor housing configured to control communications between the adaptor unit and said games console via said games console interface; and
a large capacity storage device configured to store the encoded video data;
wherein the communications controller is configured to receive game history data from the games console via the games console interface and to store the received game history data in the large capacity storage device;
wherein the communications controller is configured to output the video player software module to the games console for execution and to output encoded video data to the games console for decoding by the video player software module.

13. The adaptor unit according to claim 12, further comprising
an encryption processor configured to encrypt the encoded video data to form encrypted video data for output to said games console via said games console interface and
a secure processor within said adaptor housing configured to store an encryption key for use by said encryption processor in conjunction with encrypting said encoded video data.

14. The adaptor unit according to claim 13, wherein said secure processor is retractable from said adaptor housing and is formed on a smart-card and
wherein said adaptor housing includes
a smart-card reader configured to read the encryption key stored by the secure processor from said smart-card.

15. The adaptor unit according to claim 12, further comprising
a modem within said adaptor housing configured to connect the adaptor unit to a data network.

16. The adaptor unit according to claim 15, wherein said adaptor unit is configured to receive at least a portion of the game data from said games console and to transmit the game data received from the games console to said data network in conjunction with providing network gaming to a user of the games console;
wherein the adaptor unit is configured to receive at least a portion of the game data from said data network and to transmit the game data received from the data network to said games console in conjunction with providing the network gaming to the user of the games console.

17. The adaptor unit according to claim 12 wherein the communications controller is configured to receive a current position in a game and corresponding game history data for the game from the games console and configured to save the current position and corresponding game history data in the large capacity storage device.

18. The adaptor unit according to claim 12 wherein the communications controller is configured to transmit a saved position in a game and corresponding saved game history data for the game to the games console in response to a request from the games console, wherein the saved position and corresponding saved game history data are stored in the large capacity storage device.

19. The adaptor unit according to claim 12 wherein the video player software module is configured to decode the encoded video data to form decoded video data suitable for display such that execution of the video player software module by the games console decodes the encoded video data output from the communications controller to form the decoded video data for output to a display via the games console.

20. A games console for use with an adaptor unit, the games console comprising:
a console housing;
a game interface within said console housing configured to receive a game product;
a display interface within said console housing configured to interface said games console to a display;
a user interface within said console housing for receiving user input;
a game controller within said console housing configured to receive game data from said game interface, to receive said user input from said user interface, and to generate therefrom game video data for output to said display interface, wherein the game controller is responsive to the user input from the user interface and configured to transmit game history data to the adaptor unit;
an adaptor interface within said console housing configured to couple the games console with said adaptor unit;
a memory within the console housing configured to store software modules; and
a console processor within the console housing configured to execute the software modules stored in the memory;
wherein the games console is configured to receive a video player software module from the adaptor unit, store the video player software module in the memory, use the console processor to execute the video player software module, receive encoded video data from the adaptor unit, and use the video player software module to generate decoded video data from the received encoded video data for output to the display via the display interface;
wherein, in response to user input including a first user activation to request that a current position in a first game be saved, the game controller is configured to transmit a first request to the adaptor unit to save the current position in the first game and corresponding game history data in the adaptor unit;
wherein, in response to user input including a second user activation to request to resume play of the first game or a second game from a saved position, the game controller is configured to transmit a second request to the adaptor unit for retrieval of the saved position and corresponding saved game history data for the corresponding game from the adaptor unit and to resume play of the corresponding game from the saved position using the saved game history data.

21. The games console according to claim 20, further comprising
a web browser within said console housing configured to receive menu pages from a remote server via a modem in said adaptor unit and to generate menu screens for output to said display interface.

22. The games console according to claim 21, wherein the games console is configured to transmit and receive at least a portion of the game data to and from said data network via said modem and said adaptor unit in conjunction with providing network gaming to a user.

23. The games console according to claim 20 wherein the video player software module is configured to decode the encoded video data to form the decoded video data suitable for display such that execution of the video player software module by the console processor decodes the encoded video data received from the adaptor unit to form the decoded video data for output to the display via the display interface.

24. A method of providing decoded video data to a display, the method comprising:
interfacing an adaptor unit with a games console via a games console interface associated with the adaptor unit and an adaptor interface associated with the games console;
receiving game data associated with a game product at the games console;
receiving user input at the games console;
outputting a video player software module from the adaptor unit to the games console through the games console interface and the adaptor interface;
receiving, at the games console, the video player software module;
executing the video player software module on the games console;
receiving, at said adaptor unit, encoded video data from a remote video provider;
outputting the encoded video data from said adaptor unit to said games console through said games console interface and the adaptor interface;
decoding, in said games console, said encoded video data using the video player software module to generate decoded video data;
generating game video data based at least in part on the received game data and the received user input;
outputting the decoded video data and the game video data via a display interface associated with the games console to a display;
in response to the user input, transmitting game history data from the games console to the adaptor unit;
storing the game history data at the adaptor unit in a large capacity storage device;
saving a current position in a first game and corresponding game history data for the first game in the large capacity storage device in response to a first user activation received in the user input, the first user activation representing a first user request to save the current position in the first game; and
retrieving a saved position in the first game or a second game and corresponding saved game history data for the corresponding game from the large capacity storage device in response to a second user activation received in the user input, the second user activation representing a second user request to resume play of the first game or the second game from the corresponding saved position.

25. The method according to claim 24 wherein the video player software module is configured to decode the encoded video data to form the decoded video data suitable for display such that execution of the video player software module by the games console decodes the encoded video data received from the adaptor unit to form the decoded video data for output to the display via the display interface of the games console.

* * * * *